United States Patent
Tanaka

(10) Patent No.: US 8,861,883 B2
(45) Date of Patent: Oct. 14, 2014

(54) IMAGE PROCESSING APPARATUS, IMAGE PROCESSING METHOD, AND STORAGE MEDIUM STORING IMAGE PROCESSING PROGRAM

(75) Inventor: Hiroshi Tanaka, Ota (JP)

(73) Assignee: Fujitsu Limited, Kawaski (JP)

( * ) Notice: Subject to any disclaimer, the term of this patent is extended or adjusted under 35 U.S.C. 154(b) by 155 days.

(21) Appl. No.: 13/537,160

(22) Filed: Jun. 29, 2012

(65) Prior Publication Data

US 2013/0051683 A1 Feb. 28, 2013

(30) Foreign Application Priority Data

Aug. 22, 2011 (JP) .................. 2011-180856

(51) Int. Cl.
G06K 9/40 (2006.01)
G06T 5/00 (2006.01)
G06K 9/03 (2006.01)

(52) U.S. Cl.
CPC ............... G06T 5/003 (2013.01); G06K 9/036 (2013.01)
USPC ............ 382/255; 382/105; 382/190; 382/321

(58) Field of Classification Search
USPC .................................. 382/159, 190, 203, 267
See application file for complete search history.

(56) References Cited

U.S. PATENT DOCUMENTS

| | | | | |
|---|---|---|---|---|
| 6,553,131 | B1* | 4/2003 | Neubauer et al. | 382/105 |
| 8,422,793 | B2* | 4/2013 | Iwamura et al. | 382/201 |
| 8,442,348 | B2* | 5/2013 | Fu | 382/275 |
| 8,688,579 | B1* | 4/2014 | Ethington et al. | 705/42 |
| 2003/0002746 | A1 | 1/2003 | Kusaka | |
| 2005/0249429 | A1 | 11/2005 | Kitamura | |
| 2012/0148105 | A1* | 6/2012 | Burry et al. | 382/105 |
| 2013/0051683 | A1* | 2/2013 | Tanaka | 382/203 |

FOREIGN PATENT DOCUMENTS

| | | |
|---|---|---|
| JP | 2002-112099 | 4/2002 |
| JP | 2005-260597 | 9/2005 |
| JP | 2005-332382 | 12/2005 |

* cited by examiner

*Primary Examiner* — Gregory M Desire
(74) *Attorney, Agent, or Firm* — Staas & Halsey LLP

(57) ABSTRACT

An image processing apparatus includes: a recognition unit that performs character recognition on an image including at least one character and that obtains a score indicating a recognition accuracy of at least one character region extracted through the character recognition; a local blurring-degree computation unit that computes a first degree of blurring of the at least one character region; and a blurring-degree computation unit that computes a second degree of blurring of the image by using the score and the first degree of blurring of the at least one character region.

20 Claims, 22 Drawing Sheets

FIG. 3

*The threshold correction method consists of two submethods.*

FIG. 4

*Th hres old c ctio m thod onsis of o subme hods.*

FIG. 6A

| -1 | 0 | 1 |
|---|---|---|
| -2 | 0 | 2 |
| -1 | 0 | 1 |

FIG. 6B

| -1 | -2 | -1 |
|---|---|---|
| 0 | 0 | 0 |
| 1 | 2 | 1 |

FIG. 10

| 0 | -1 | 0 |
|---|----|---|
| -1 | 5 | -1 |
| 0 | -1 | 0 |

IMAGE PROCESSING APPARATUS, IMAGE PROCESSING METHOD, AND STORAGE MEDIUM STORING IMAGE PROCESSING PROGRAM

CROSS-REFERENCE TO RELATED APPLICATION(S)

This application is based upon and claims the benefit of priority of the prior Japanese Patent Application No. 2011-180856, filed on Aug. 22, 2011, the entire contents of which are incorporated herein by reference.

FIELD

The embodiments discussed herein are related to an image processing apparatus, an image processing method, and a program which compute a degree of blurring from an image including characters.

BACKGROUND

When a document is converted into an electronic form so as to be stored, a scanner is often used as a unit for inputting an image. A scanner has a light source therein, and reads reflected light obtained by irradiating a document with light, by using a sensor such as a charge coupled device (CCD) so as to generate a digital image.

Since a condition such as a distance to the light source or the sensor is not varied, it is possible for a scanner to obtain a high-quality image. However, when the resolution of an image to be output is low, it is difficult to reproduce small characters clearly.

In addition, to reduce the data size of an obtained image, the obtained image is often subjected to, for example, an image compression process such as Joint Photographic Experts Group (JPEG). On the other hand, when lossy compression is used as an image compression process, fine characteristics of an image may be lost, thereby reducing the image quality.

Recently, there have been more opportunities to capture documents by using a digital camera so that document images are obtained. A document image is an image obtained by photographing a document including characters. When a document image is obtained using a digital camera, blurring in an image is likely to occur due to defocusing in comparison with a scanner. Hereinafter, image degradation due to various factors is called blurring of an image.

Character contours are unclear in a blurred image, thereby reducing readability of a document. In addition, there is a problem in that a blurred image leads to low accuracy in character recognition or the like performed to analyze the contents of a document image. Therefore, a technique for correcting blurring of an image so as to generate a clear image is desirable. Hereinafter, an operation of converting an image in which blurring occurs into a clearer image is called blur correction. An image in which blurring occurs is called a blurred image.

When the extent to which an image is blurred has already been determined, it is known that an inverse filter for correcting blurring or sharpening of an image enables an image to be restored to an image without blurring. Accordingly, a method is proposed in which the extent to which an input image is blurred (hereinafter, referred to as degree of blurring) is determined and the blurred image is appropriately corrected.

For example, a technique is proposed in which an additional device such as a distance sensor is used to determine the degree of blurring of an image. Another technique is proposed in which the degree of blurring is determined using a degree of sharpening of an edge which is obtained from an image of a human eye. Yet another technique is proposed in which the degree of blurring is determined by extracting a position of a character from an image and obtaining the width of pixels that are located in an edge region of the character and that are illustrated in halftones. These techniques are disclosed in, for example, Japanese Laid-open Patent Publication No. 2002-112099 and No. 2005-332382, and Japanese Patent No. 4315024.

SUMMARY

According to an aspect of the invention, an image processing apparatus includes: a recognition unit that performs character recognition on an image including at least one character and that obtains a score indicating a recognition accuracy of at least one character region extracted through the character recognition; a local blurring-degree computation unit that computes a first degree of blurring of the at least one character region; and a blurring-degree computation unit that computes a second degree of blurring of the image by using the score and the first degree of blurring of the at least one character region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating exemplary characters included in a document image;

FIG. 4 is a diagram illustrating exemplary selected characters;

FIGS. 6A and 6B are diagrams illustrating sobel filters;

FIG. 10 is a diagram illustrating an exemplary high emphasis filter;

DESCRIPTION OF EMBODIMENTS

However, in the technique of the related art in which a distance sensor is used, use of a special sensor is desirable, resulting in an increase in cost. As in other techniques of the related art, when a degree of blurring is determined using an input image itself and when a process of extracting a character region or an eye region results in failure, the obtained degree of blurring is an inappropriate value. Blur correction performed using an inappropriate value of the degree of blurring may further degrade the image quality.

Therefore, the related art has a problem in that when a degree of blurring is computed using an image itself, an adequate degree of blurring fails to be obtained for an image including characters.

Accordingly, an object of a technique discussed herein is to obtain an adequate degree of blurring of an image including characters when a degree of blurring is computed using an image itself.

Embodiments will be described below with reference to the accompanying drawings.

First Embodiment

Hardware

Figure 1:
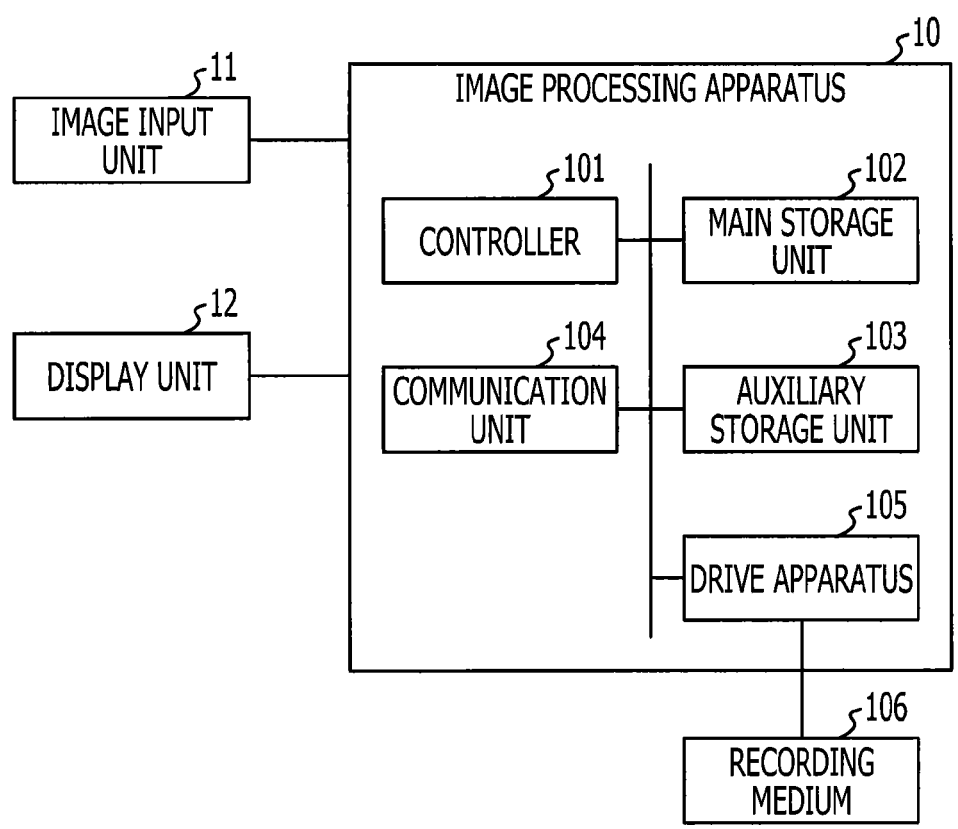
FIG. 1 is a block diagram illustrating exemplary hardware of an image processing apparatus according to a first embodiment.

FIG. 1 is a block diagram illustrating exemplary hardware of an image processing apparatus 10 according to a first embodiment. In the example illustrated in FIG. 1, the image processing apparatus 10 is connected to an image input unit 11 and a display unit 12. The image input unit 11 is an apparatus for generating digital images, such as a scanner or a digital camera.

For example, when the image input unit 11 is a scanner, the image input unit 11 scans an image on paper so as to obtain pixel values one by one with respect to the x and y coordinates arrayed in two dimensions. When the pixel values are obtained from a color image, each of the pixel values is expressed with a set of three colors of R (red), G (green), and B (blue).

When the pixel values are obtained from a grey image, each of the pixel values is often expressed as a lightness value. A color pixel value expressed with three RGB colors may be converted into a lightness value by using a conversion expression, lightness-value=0.299×R+0.587×G+0.114×B.

Blur correction to an image may be performed on a color image with consideration given to correlation between the colors, or without such consideration, that is, under the condition that the colors are regarded as being independent. Here, it is assumed that correlation between the colors is not taken into account and that a color image is corrected by applying a correction process to a lightness image with respect to each of the three colors independently.

Accordingly, hereinafter, assume that a pixel value is expressed as a lightness value and a lightness value in each of pixels is expressed as an integer ranging from 0 to 255. That is, one pixel is represented by one byte. The pixel values obtained by the image input unit 11 are output to the image processing apparatus 10.

The image processing apparatus 10 computes a degree of blurring, which indicates the extent to which an image is blurred, for the image obtained from the image input unit 11. At that time, the obtained image includes, for example, characters Hereinafter, an image including characters is also referred to as a document image.

The image processing apparatus 10 uses the computed degree of blurring to correct blurring. The image processing apparatus 10 may control the display unit 12 so as to display an image obtained through the blur correction on the display unit 12.

The display unit 12 is, for example, a cathode ray tube (CRT) or a liquid crystal display (LCD), and displays an image which is obtained through blur correction and which is received from the image processing apparatus 10.

The image processing apparatus 10 includes a controller 101, a main storage unit 102, an auxiliary storage unit 103, a communication unit 104, and a drive apparatus 105. These units are connected to each other via a bus so as to be capable of receiving/transmitting data from/to each other.

The controller 101 is a central processing unit (CPU) which performs control of devices, and computation and processing on data in a computer. The controller 101 is also an arithmetic-logic unit which executes programs stored in the main storage unit 102 and the auxiliary storage unit 103. The controller 101 receives data from an input apparatus or a storage apparatus, computes and processes it, and outputs the resulting data to an output apparatus or a storage apparatus.

The main storage unit 102 is, for example, a read only memory (ROM) or a random access memory (RAM). The main storage unit 102 is a storage apparatus which non-temporarily or temporarily stores data and programs, such as an operating system (OS), which is basic software, and application programs, which are executed by the controller 101.

The auxiliary storage unit 103 is, for example, a hard disk drive (HDD), and is a storage apparatus which stores data related to, for example, application software. The auxiliary storage unit 103 stores, for example, an image obtained from the image input unit 11.

The communication unit 104 communicates data with peripherals through wired or wireless connections. The communication unit 104 obtains an image including characters via, for example, a network, and stores the obtained image in the auxiliary storage unit 103.

The drive apparatus 105 reads out a certain program from a recording medium 106, such as a flexible disk or a compact disk (CD), and installs it in a storage apparatus.

The recording medium 106 stores an image processing program. The image processing program stored in the recording medium 106 is installed in the image processing apparatus 10 via the drive apparatus 105. The certain program which has been installed is ready to be executed by the image processing apparatus 10.

Note that a configuration is employed in which the image processing apparatus 10 is independent of the image input unit 11 and the display unit 12. However, a configuration may be employed in which the image processing apparatus 10 includes either one or both of the image input unit 11 and the display unit 12.

Functions

Figure 2:
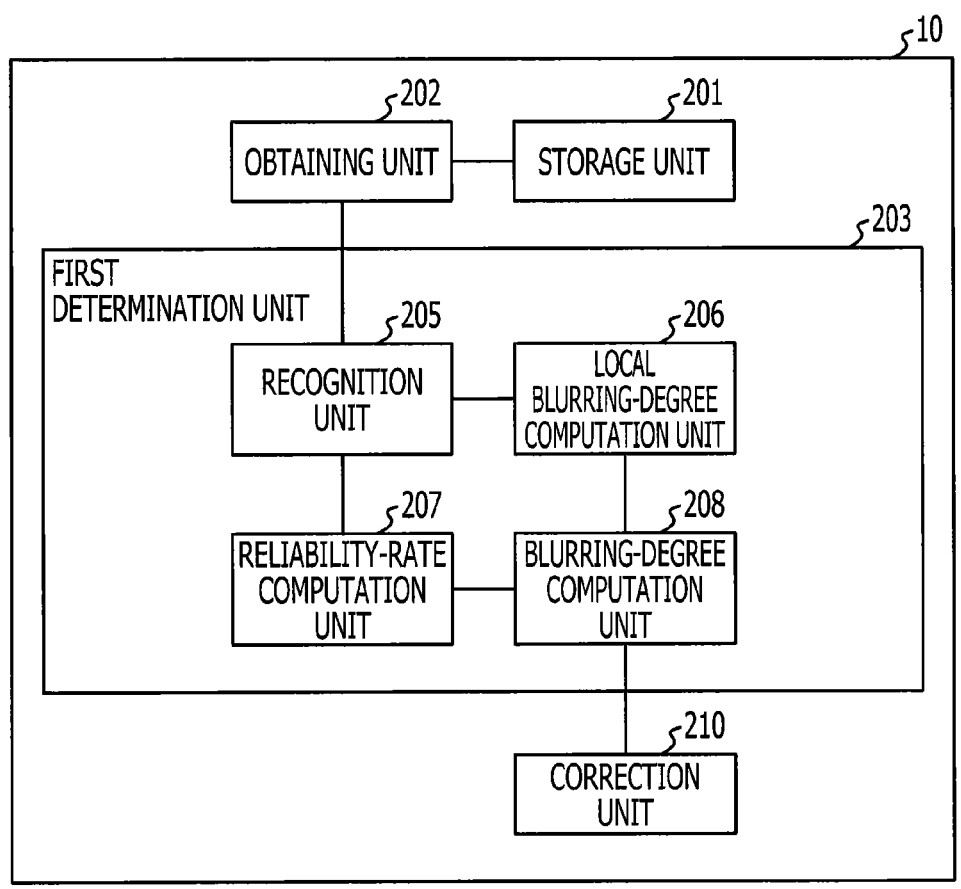
FIG. 2 is a block diagram illustrating exemplary functions of the image processing apparatus according to the first embodiment.

FIG. 2 is a block diagram illustrating exemplary functions of the image processing apparatus 10 according to the first embodiment. In an example illustrated in FIG. 2, the image processing apparatus 10 includes a storage unit 201, an obtaining unit 202, a first determination unit 203, and a correction unit 210.

The storage unit 201 stores an image obtained from the image input unit 11, the communication unit 104, or the drive apparatus 105. This image is, for example, a document image.

The obtaining unit 202 obtains a document image from the storage unit 201, and outputs the obtained document image to the first determination unit 203.

The first determination unit 203 performs character recognition on the document image. The first determination unit 203 computes the degree of blurring of the entire image based on scores of recognized characters and the degrees of blurring of the recognized characters. The use of the scores of the recognized characters enables a case in which the recognized characters themselves are improper to be removed, resulting in computation of the degree of blurring of the entire image based on proper characters.

Now, an overview of the first determination unit 203 will be described. Assume a case in which the first determination unit 203 computes the degree of blurring for a document image illustrated in FIG. 3. FIG. 3 is a diagram illustrating exemplary characters included in the document image. The document image illustrated in FIG. 3 is blurred.

The first determination unit 203 performs character recognition on the document image illustrated in FIG. 3. Assume that the first determination unit 203 performs character recognition on the character string "The threshold correction method consists of two submethods." and the recognition result is the character string "Tha ihresnold cOMctior method oonsisU of nvo submelhods".

The first determination unit 203 computes a degree of blurring for each of the recognized characters by using, for example, edge strength. Preferably, the first determination unit 203 computes the degree of blurring of the entire image by using simply the degrees of blurring of the correctly recognized characters. Accordingly, the first determination unit 203 uses the scores of the recognized characters to select which characters are to be used.

FIG. 4 is a diagram illustrating exemplary selected characters. In the example illustrated in FIG. 4, the character string "Th hres old c ctio m thod onsis of o subme hods." is used to compute the degree of blurring of the entire image. Thus, the degrees of blurring of the improperly recognized characters may be removed from the computation of the degree of blurring of the entire image, resulting in computation of a proper value for the degree of blurring of the entire image.

Functions of the first determination unit 203 for achieving the above-described function will be described in detail below.

Referring back to FIG. 2, the first determination unit 203 includes a recognition unit 205, a reliability-rate computation unit 207, a local blurring-degree computation unit 206, and a blurring-degree computation unit 208.

The recognition unit 205 receives a document image, performs character recognition on the document image, and outputs the positions of the characters in the document image and the recognition results. Each recognition result includes a character code of a recognized character and a score which indicates a recognition accuracy.

To perform character recognition, the recognition unit 205 may use, for example, commercial optical character recognition (OCR) software. For example, in FineReader developed by ABBYY, a software development kit (SDK) for FineReader is provided, whereby it is possible to obtain position coordinates, and a character code and a score of the recognition result for each of characters from the program.

Figure 5:
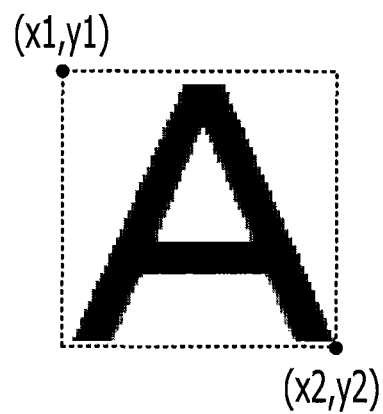
FIG. 5 is a diagram illustrating positions for a recognized character.

FIG. 5 is a diagram illustrating positions for a recognized character. For example, regarding a recognized character, coordinates values of the upper left position (x1, y1) and the lower right position (x2, y2) of a circumscribed rectangle of the character image indicate the position of the character, as illustrated in FIG. 5.

Herein, the center point, (cx, cy)=((x1+x2)/2, (y1+y2)/2), of the circumscribed rectangle is regarded as the position coordinates of the character. The recognition result is a pair of a character code and a score.

The definition of a score depends on character recognition software. Definitions of a score are classified into two: a definition in which a higher score value indicates a higher evaluation for the recognition; and, in contrast, a definition in which a lower score value indicates a higher evaluation for the recognition. The evaluation of a recognition result indicates a correct-recognition possibility. The former is often referred to as a likelihood, and the latter is often referred to as a distance. Herein, to simplify the explanation, a score is expressed as an integer from 0 to 100. In the case of no correct-recognition possibility, the score is set to 0, and in the case of the highest possibility, the score is set to 100.

The recognition unit 205 outputs a character region indicated by the position of each of the recognized characters to the local blurring-degree computation unit 206. The recognition unit 205 also outputs the position and the recognition result of each recognized character to the reliability-rate computation unit 207.

Referring back to FIG. 2, the local blurring-degree computation unit 206 obtains the degree of blurring for the character region obtained from the character recognition. The degree of blurring of a character region is called a degree of local blurring. The local blurring-degree computation unit 206 first obtains gradient values for all of the pixels in the character region.

Figures 6A, 6B:
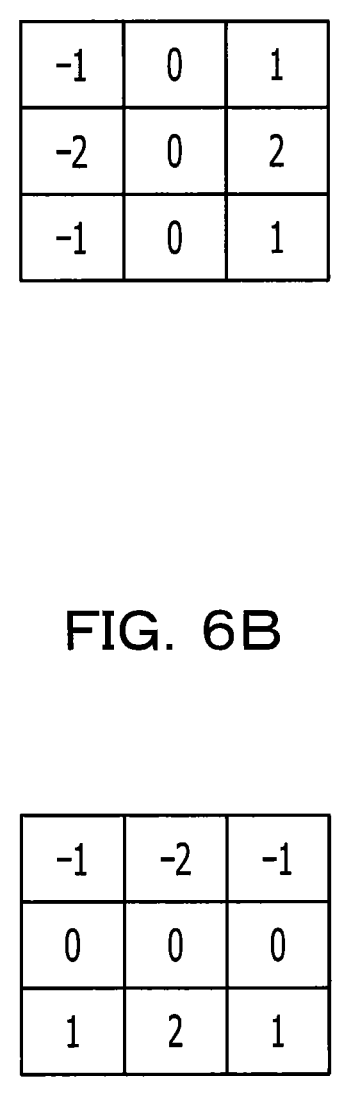

To obtain a gradient value, the local blurring-degree computation unit 206 obtains results of a product-sum operation between gradient filters each of which is called a sobel filter and an image, and obtains gradient values in the x direction and the y direction. FIGS. 6A and 6B are diagrams illustrating sobel filters. FIG. 6A illustrates a filter in the x direction, and FIG. 6B illustrates a filter in the y direction.

A gradient value S is expressed by Expression (1), where a gradient value in the x direction is represented by Sx, and a gradient value in the y direction is represented by Sy.

$$S=\sqrt{Sx^2+Sy^2} \qquad \text{Expression (1)}$$

The maximum gradient value in the character region is represented by Smax. The maximum pixel value in the character region is represented by Vmax, and the minimum pixel value is represented by Vmin. A value RT which is called a gradient ratio is defined in Expression (2).

$$RT = \frac{Smax}{Vmax - Vmin} \qquad \text{Expression (2)}$$

Figure 7:
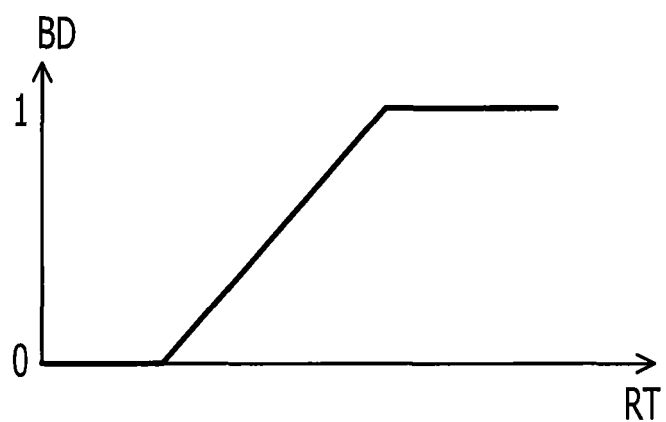
FIG. 7 is a diagram illustrating the relationship between a degree of local blurring and a gradient ratio.

The local blurring-degree computation unit 206 obtains a gradient ratio RT for the character region, and obtains a degree of local blurring BD by using a graph as illustrated in FIG. 7. FIG. 7 is a diagram illustrating the relationship between a degree of local blurring and a gradient ratio. The graph illustrated in FIG. 7 may be set as appropriate. However, a monotonically increasing graph which includes a horizontal range as illustrated in FIG. 7 is typically used.

As the increasing section of the graph, a certain range may be set as appropriate, for example, a range of RT from 0.5 to 3.0. Thus, the local blurring-degree computation unit 206 may obtain a degree of local blurring BD by using the gradient ratio RT from the image of the character region. The value of BD ranges from 0 to 1.

When the local blurring-degree computation unit 206 receives a color image, a similar computation may be performed on each of the three RGB colors, and the average of the degrees of local blurring for the RGB colors may be set as the degree of local blurring of the character region.

Other known techniques other than the above-described technique may be used as a method of computing a degree of local blurring. For example, a method may be used in which a character recognition function is used to compute a degree of local blurring.

Typically, a recognition dictionary used for character recognition is created through learning using a large amount of training character images for each of characters. Herein, multiple training images obtained through blurring conversion on training character images are prepared, and are classified into groups in accordance with the degrees of blurring of the images. A dictionary for recognition is created through learning for each of the groups. As a result, multiple recognition dictionaries are created in accordance with the degrees of blurring of the images.

When character recognition is to be performed, recognition distances are computed using all of the dictionaries which correspond to the degrees of blurring, and the minimum recognition distance is regarded as a recognition result for the entire recognition. Here, the degree of blurring of the image that is to be recognized may be determined in accordance with the degree of blurring to which the dictionary that is used when the minimum recognition distance is computed corresponds. In this case, the local blurring-degree computation unit 206 obtains the degree of local blurring from the recognition unit 205.

See, for example, Japanese Laid-open Patent Publication No. 2003-145898 regarding a method of using dictionaries corresponding to multiple image qualities to obtain the degree of blurring of a dictionary with which the closest similarity between characters is obtained, as described above. The local blurring-degree computation unit 206 outputs the obtained degree of local blurring to the blurring-degree computation unit 208.

The reliability-rate computation unit 207 obtains a reliability rate indicating reliability of the degree of local blurring which is obtained from the character region, based on the score from the character recognition. The reliability of a degree of local blurring indicates whether the degree of local blurring may be used for the determination of the degree of blurring of the entire image.

For example, the reliability-rate computation unit 207 may obtain, as a probability value, a possibility with which the result of the character recognition may be correct, and use the probability value as a reliability rate.

The score obtained through the character recognition does not necessarily indicate a correct-recognition probability. Accordingly, the reliability-rate computation unit 207 may convert the score into a value indicating a correct-recognition probability. For example, there is provided a technique in which training data including a large amount of character images is used to obtain a frequency distribution of scores that are obtained through correct recognition and a frequency distribution of scores that are obtained through incorrect recognition for each of character categories and to obtain a correct-recognition probability from a recognition score. This technique is disclosed in O. Velek, S. Jaegar, M. Nakagawa, "Accuulated-Recognition-Rate Normalization for Combining Multiple On/Off-Line Japanese Character Classifiers Tested on a Large Database", 4*th. Intl. Workshop on Multiple Classifier Systems (MCS*2003), pp. 196-205, 2003 (hereinafter, referred to as Reference Literature 1).

Figure 8:
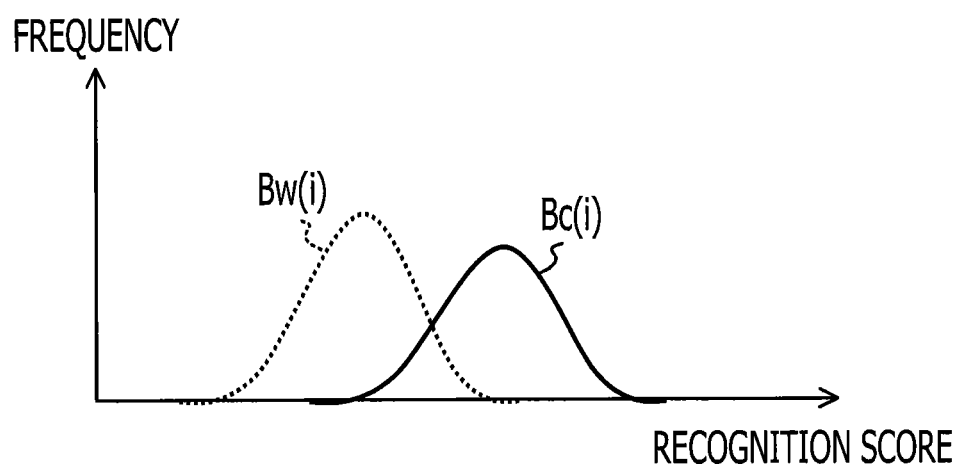
FIG. 8 is a diagram illustrating an exemplary pair of a correct-recognition frequency distribution and an incorrect-recognition frequency distribution.
Figure 9:
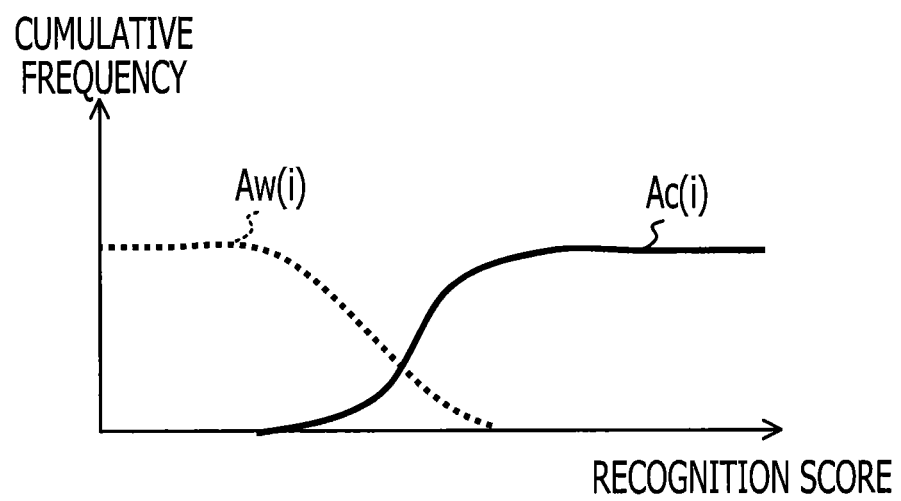
FIG. 9 is a diagram illustrating an exemplary pair of a correct-recognition cumulative frequency distribution and an incorrect-recognition cumulative frequency distribution.

Now, referring to FIGS. 8 and 9, a procedure for obtaining a correct-recognition probability from a recognition score will be briefly described. As described in Reference Literature 1, a large amount of training images are prepared for each of character categories. The character images in the prepared training images are recognized using the recognition unit 205.

Then, the reliability-rate computation unit 207 obtains recognition scores obtained from the individual images, and frequencies of the scores classified according to the determination as to whether the recognition is correct or incorrect. FIG. 8 is a diagram illustrating an exemplary pair of a correct-recognition frequency distribution and an incorrect-recognition frequency distribution. In FIGS. 8 and 9, the solid line represents a correct-recognition frequency distribution, and a dotted line represents an incorrect-recognition frequency distribution.

Then, the reliability-rate computation unit 207 obtains cumulative frequency distributions from the frequency distributions illustrated in FIG. 8. FIG. 9 is a diagram illustrating an exemplary pair of a correct-recognition cumulative frequency distribution and an incorrect-recognition cumulative frequency distribution. In the correct-recognition cumulative frequency distribution illustrated in FIG. 9, scores are accumulated in ascending order, and in the incorrect-recognition cumulative frequency distribution, scores are accumulated in descending order. The maximum values are normalized into the same value, so that the graph illustrated in FIG. 9 is obtained.

The correct-recognition cumulative frequency for a recognition score is represented by Ac, and the incorrect-recognition cumulative frequency for the recognition score is represented by Aw. The reliability-rate computation unit 207 obtains a correct-recognition probability P for the recognition score by using Expression (3).

$$P=Ac/(Ac+Aw) \quad \text{Expression (3)}$$

The correct-recognition frequency distribution illustrated in FIG. 8 is represented by Bc(i); the incorrect-recognition frequency distribution is represented by Bw(i); the correct-recognition cumulative frequency distribution illustrated in FIG. 9 is represented by Ac(i); and the incorrect-recognition cumulative frequency distribution is represented by Aw(i). The minimum value of a recognition score is 0, and the maximum value is represented by D.

The reliability-rate computation unit 207 obtains the cumulative frequency distributions illustrated in FIG. 9 by using Expressions (4) and (5).

$$Ac(i) = \frac{\sum_{j=0}^{t} Bc(j)}{\sum_{j=0}^{D} Bc(j)} \quad \text{Expression (4)}$$

-continued $$Aw(i) = \frac{\sum_{j=0}^{D} Bw(j)}{\sum_{j=0}^{D} Bw(j)}$$

Expression (5)

The reliability-rate computation unit 207 computes a correct-recognition probability P indicating a reliability rate for each of character regions. The reliability-rate computation unit 207 outputs the computed reliability rates to the blurring-degree computation unit 208.

Referring back to FIG. 2, the blurring-degree computation unit 208 obtains the degrees of local blurring BD of the character regions from the local blurring-degree computation unit 206, and reliability rates of the character regions from the reliability-rate computation unit 207. The blurring-degree computation unit 208 computes the degree of blurring of the entire document image based on the degrees of local blurring and the reliability rates.

Assume that the number of character regions which are extracted from the document image is N. The degree of local blurring of each of the character regions is represented by BD(i), and the reliability rate is represented by P(i). The degree of blurring Bdoc of the entire document image is computed using Expression (6).

$$Bdoc = \frac{\sum_{i=1}^{K} BD(i) \times P(i)}{\sum_{i=0}^{N} P(i)}$$

Expression (6)

The blurring-degree computation unit 208 outputs the computed degree of blurring Bdoc to the correction unit 210. The blurring-degree computation unit 208 may use the scores obtained by the recognition unit 205, instead of the reliability rates. In the case of the use of the sores, the blurring-degree computation unit 208 normalizes the scores so as to convert the scores into, for example, values ranging from 0 to 1, uses the normalized scores to perform weighted averaging on the degrees of local blurring, and computes the degree of blurring of the entire image. In the case of the use of the scores, the reliability-rate computation unit 207 is unnecessary.

Thus, it is possible to compute the degree of blurring of the entire document image in such a manner that the degrees of local blurring of character regions, each of which has a high reliability rate, are dominantly used.

The correction unit 210 obtains the degree of blurring from the blurring-degree computation unit 208. The correction unit 210 sharpens the image based on the obtained degree of blurring and converts the blurred image into a clear image. Here, a pixel value in the x and y coordinates of an input image is represented by I(x, y), and a pixel value obtained through blur correction is represented by I'(x, y). The degree of blurring obtained from the blurring-degree computation unit 208 is represented by Bdoc.

To employ a technique for correcting blurring of an image so as to restore the image to an original image without blurring, for example, a Wiener filter or a high emphasis filter that emphasizes high-pass components of an image in a simpler manner may be used. Regarding the Wiener filter and the high emphasis filter, see Hideyuki Tamura, *Konpyuta Gazou Shori* (*Computer Image Processing*), Ohmsha, ISBN4-274-13264-1, pp. 109, 121.

Figure 10:
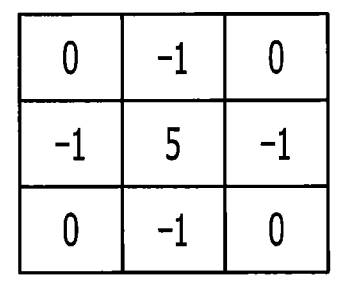

Now, a method in which a high emphasis filter is used will be described. FIG. 10 is a diagram illustrating an exemplary high emphasis filter. The example illustrated in FIG. 10 is a difference obtained by subtracting Laplacian, which is a second derivative of an input image, from the input image. This computation expression is expressed by Expression (7), where J(x, y) represents a pixel value obtained through high emphasis, and $\nabla^2 I(x, y)$ represents Laplacian.

$$J(x, y) = I(x, y) - \nabla^2 I(x, y) = 5 \times I(x, y) -$$

Expression (7)

$$[I(x+1, y) + I(x-1, y) + I(x, y+1) + I(x, y-1)]$$

The correction unit 210 computes pixel values obtained through high emphasis by using Expression (7). Expression (7) indicates that the values in the filter illustrated in FIG. 10 are used as a coefficient to perform a convolution product-sum operation on the input image.

The conversion using the filter illustrated in FIG. 10 is effective in sharpening an image when the degree of blurring is large. On the contrary, when the degree of blurring is small, there is a problem in that high-pass components in an image are overemphasized. Accordingly, the correction unit 210 assigns weights to pixel values obtained through the emphasis, by using the degree of blurring Bdoc, and computes a corrected image I'(x, y). This computation expression is expressed by Expression (8).

$$I'(x,y)=(1-Bdoc) \times I(x,y)+Bdoc \times J(x,y)$$

Expression (8)

Thus, it is possible for the image processing apparatus 10 to obtain an adequate degree of blurring of a document image, and to perform blur correction based on the adequate degree of blurring.

The local blurring-degree computation unit 206 may simply perform computation of the degrees of local blurring for character regions that each have a score or a reliability rate which is equal to or more than a certain threshold, instead of computation of the degrees of local blurring for all of the extracted character regions. Thus, the number of computations may be reduced.

Operations

Figure 11:
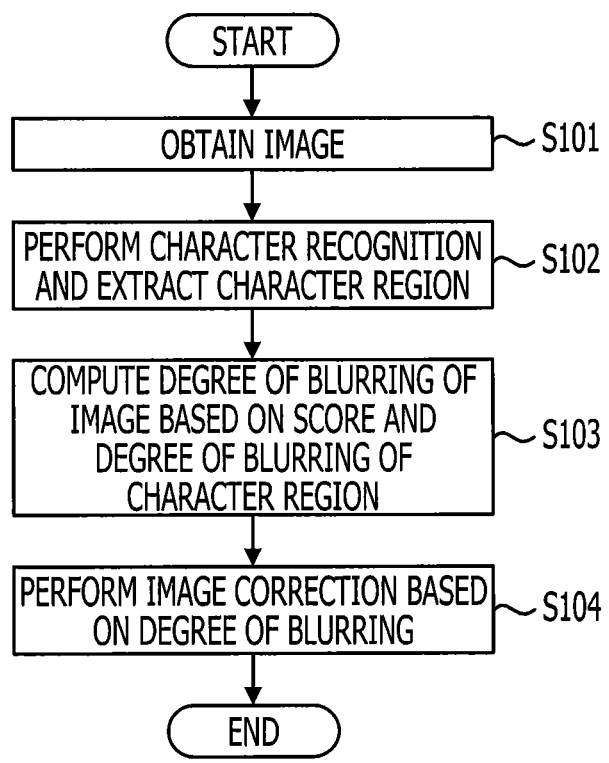
FIG. 11 is a flowchart of exemplary image processing according to the first embodiment.

Now, operations of the image processing apparatus 10 according to the first embodiment will be described. FIG. 11 is a flowchart of exemplary image processing according to the first embodiment.

In step S101 illustrated in FIG. 11, the obtaining unit 202 obtains a document image from the storage unit 201.

In step S102, the recognition unit 205 performs character recognition and extracts one or more character regions.

In step S103, the first determination unit 203 computes the degree of blurring of the entire image based on the scores and the degrees of local blurring of the character regions. This process will be described in detail with reference to FIG. 12.

In step S104, the correction unit 210 performs image correction based on the degree of blurring computed by the first determination unit 203. The image correction includes, for example, the computations expressed by Expressions (7) and (8).

Figure 12:
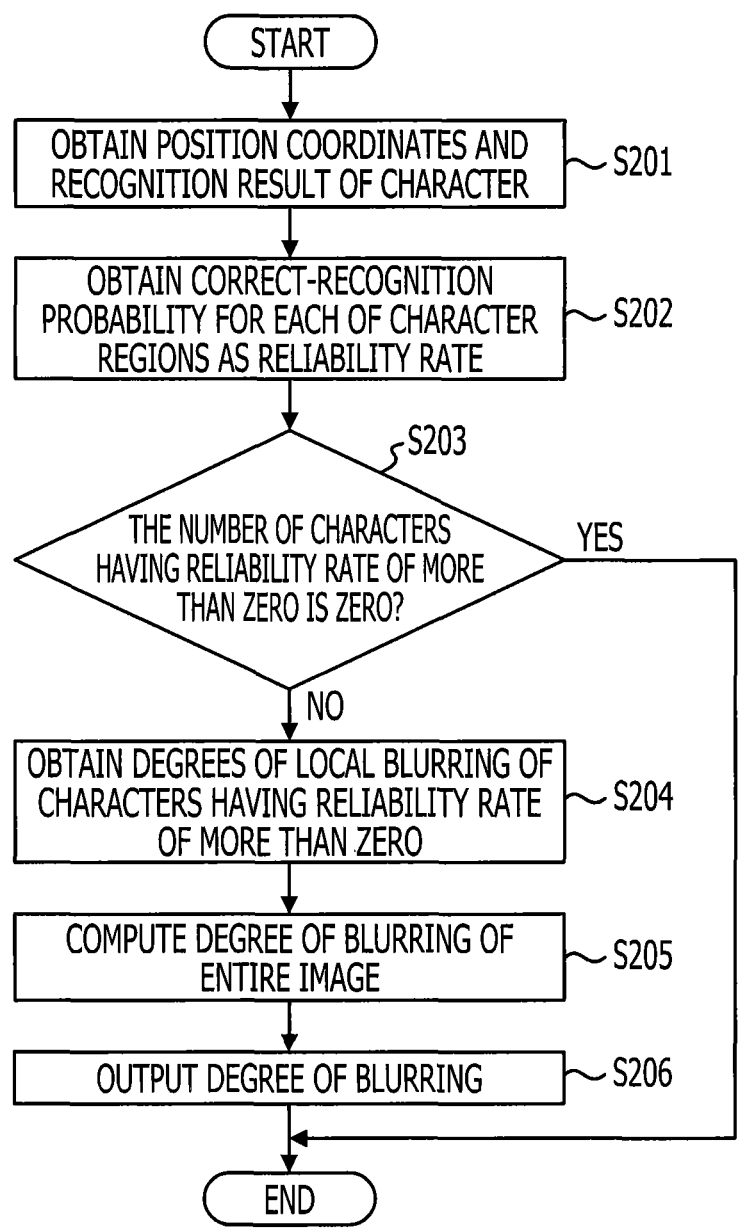
FIG. 12 is a flowchart of an exemplary process of computing a degree of blurring according to the first embodiment.

FIG. 12 is a flowchart of an exemplary process of computing a degree of blurring according to the first embodiment. In step S201 illustrated in FIG. 12, the recognition unit 205 obtains position coordinates and a recognition result (a character code and a score) of a character in each of the extracted character regions.

In step S202, the reliability-rate computation unit 207 obtains a correct-recognition probability of a character in each of the character regions, and regards this correct-recognition probability as a reliability rate.

In step S203, the first determination unit 203 determines whether or not the number of characters that have a reliability rate of more than zero is equal to zero. If this condition is satisfied (YES in step S203), the process ends because there are no characters. If this condition is not satisfied (NO in step S203), the process proceeds to step S204.

In step S204, the local blurring-degree computation unit 206 obtains the degrees of local blurring of characters having a reliability rate of more than zero.

In step S205, the blurring-degree computation unit 208 computes the degree of blurring of the entire image based on the reliability rates and the degrees of local blurring.

In step S206, the blurring-degree computation unit 208 outputs the computed degree of blurring to the correction unit 210.

As described above, according to the first embodiment, when the degree of blurring is to be computed using an image itself, it is possible to obtain an adequate degree of blurring of an image including characters. Thus, according to the first embodiment, improvement in accuracy of correction of blurring is achieved based on the adequate degree of blurring.

In addition, according to the first embodiment, an image itself is analyzed without a special apparatus such as a sensor, thereby obtaining a clearer document image with less blurring. Thus, improvement in readability of a document image and improvement in accuracy of character recognition are likely achieved. Furthermore, when an out-of-focus document image captured by using a digital camera or the like is obtained, or when sharpness of a character image is reduced through image compression or the like, it is possible to accurately recognize, search, and read the document image.

Second Embodiment

Now, an image processing apparatus according to a second embodiment will be described. According to the second embodiment, a process of computing a degree of blurring and a process of correcting blurring are repeated, resulting in improvement in accuracy of character recognition and an increase in the number of character regions used to compute the degree of blurring. The hardware of the image processing apparatus according to the second embodiment is similar to that according to the first embodiment, and will not be described.

Functions

Figure 13:
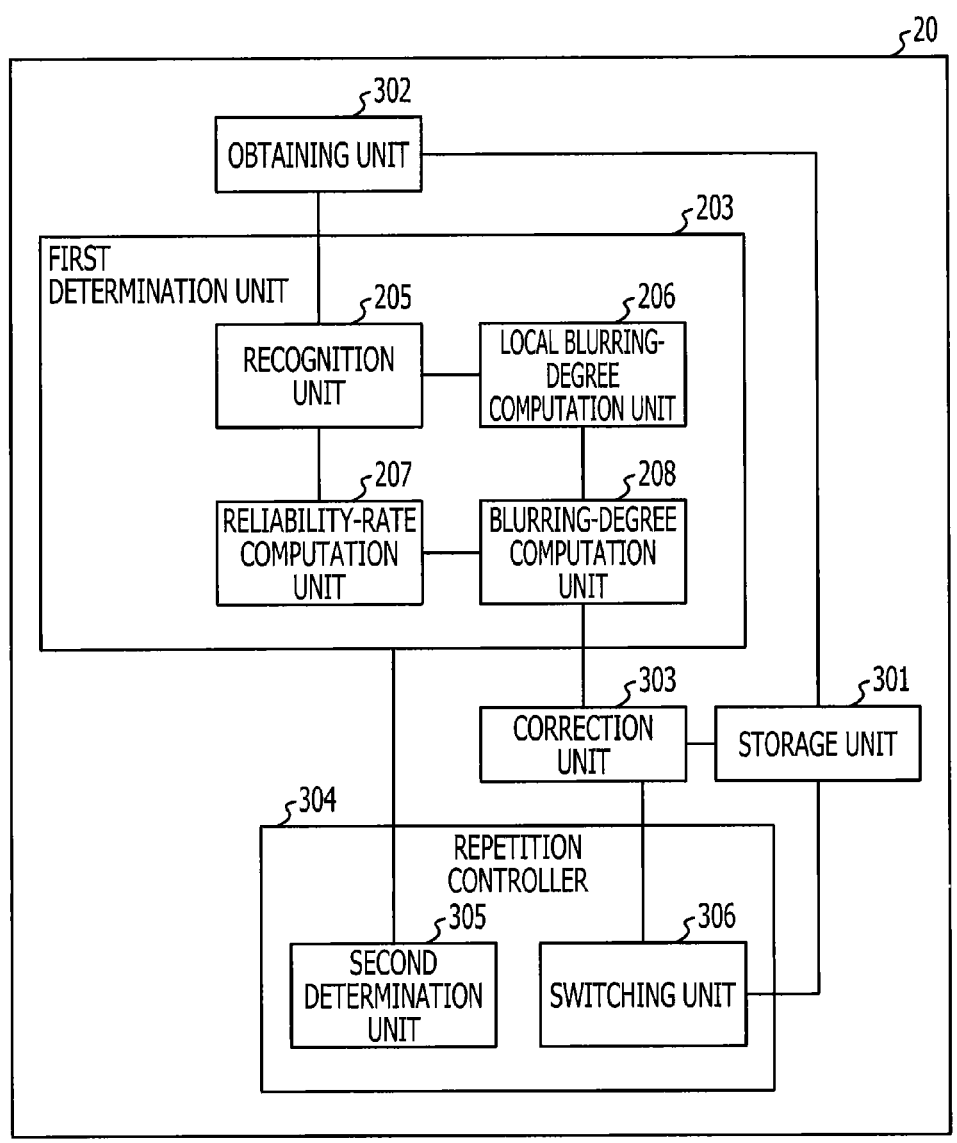
FIG. 13 is a block diagram illustrating exemplary functions of an image processing apparatus according to a second embodiment.

FIG. 13 is a block diagram illustrating exemplary functions of an image processing apparatus 20 according to the second embodiment. In the configuration illustrated in FIG. 13, components that are similar to those illustrated in FIG. 2 are designated with the same reference numerals, and will not be described.

A storage unit 301 stores a corrected image obtained through blur correction as well as the image described in the first embodiment.

When the degree of blurring is repeatedly computed, an obtaining unit 302 obtains the corrected image stored in the storage unit 301, and outputs the obtained corrected image to the first determination unit 203.

The first determination unit 203 computes the degree of blurring for the corrected image from the second repetition.

A correction unit 303 outputs the corrected image obtained through blur correction to the storage unit 301 and a repetition controller 304.

The repetition controller 304 repeatedly performs a process of performing character recognition on the corrected image obtained through blur correction and computing the degree of blurring of the image and a process of correcting blurring until a certain condition is satisfied. The repetition controller 304 includes a second determination unit 305 and a switching unit 306.

The second determination unit 305 determines whether or not the repetition of the process of correcting blurring is to be ended. For example, if the maximum number for the repetition is fixed to a preset number, the second determination unit 305 may count the number of repetitions and compare the counted number with the preset number.

If other conditions are used to determine the end the repetition, logic for determining whether those conditions are satisfied may be incorporated in the second determination unit 305.

The second determination unit 305 outputs two results, i.e., a determination result of "end of the repetition" or "continuation of the repetition" and a determination result of "output of the input image" or "output of the corrected image", to the switching unit 306.

The switching unit 306 switches the image to be output based on the determination result from the second determination unit 305. When the switching unit 306 receives the determination of "end of the repetition", the switching unit 306 causes output of the input image or the corrected image. When the switching unit 306 receives the determination of "continuation of the repetition", the switching unit 306 does not cause output of an image.

When the determination of "continuation of the repetition" is obtained, the repetition controller 304 repeatedly performs the process of computing a degree of blurring and the process of correcting blurring. For example, the repetition controller 304 causes the corrected image stored in the storage unit 301 to be output to the obtaining unit 302, or instructs the obtaining unit 302 to obtain the corrected image from the storage unit 301. Thus, the degree of blurring is repeatedly computed based on the corrected image.

Figure 14:
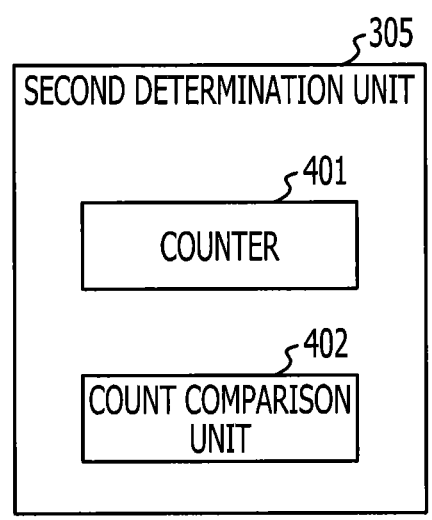
FIG. 14 is a diagram illustrating first exemplary functions of a second determination unit.

FIG. 14 is a diagram illustrating first exemplary functions of the second determination unit 305. In the example illustrated in FIG. 14, the second determination unit 305 uses determination as to whether the number of repetitions reaches a certain number as the condition for determining the end of the repetition.

The second determination unit 305 illustrated in FIG. 14 includes a counter 401 and a count comparison unit 402.

The counter 401 counts the number of repetitions of the processes of computing a degree of blurring and of correcting blurring.

The count comparison unit 402 holds a certain number, and compares the certain number with the number of repetitions which is counted by the counter 401. For example, the certain number is set to five.

The count comparison unit 402 outputs the determination of "continuation of the repetition" to the switching unit 306 if the number of repetitions does not reach the certain number, whereas the count comparison unit 402 outputs the determination of "end of the repetition" to the switching unit 306 if the number of repetitions reaches the certain number.

In this case, the second determination unit 305 consistently outputs the determination result of "output of the corrected image" to the switching unit 306 regarding the type of an image to be output.

Figure 15:
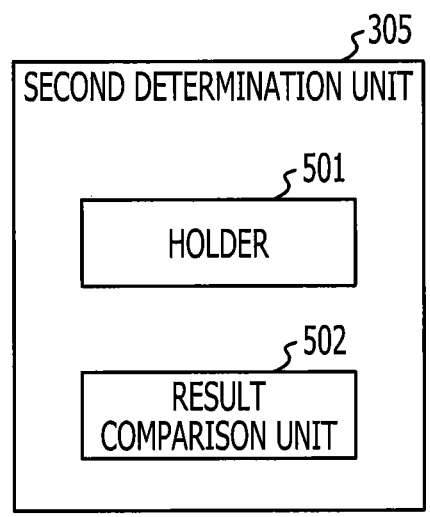
FIG. 15 is a diagram illustrating second exemplary functions of the second determination unit.

FIG. 15 is a diagram illustrating second exemplary functions of the second determination unit 305. In the example illustrated in FIG. 15, the second determination unit 305 uses recognition results obtained before and after a repetition as the condition for determining the end of the repetition.

The second determination unit 305 illustrated in FIG. 15 includes a holder 501 and a result comparison unit 502.

The holder 501 holds a character recognition result obtained just before a repetition. The recognition result includes, for example, position coordinates, a character code, and a score for each of the character regions. The recognition result may further include reliability rates computed by the reliability-rate computation unit 207.

The result comparison unit 502 compares the latest recognition result with the recognition result held by the holder 501. For example, the result comparison unit 502 compares the recognition results obtained before and after a repetition. At that time, when the evaluation of the latest recognition result is higher than that of the recognition result obtained just before the repetition, the result comparison unit 502 outputs the determination of "continuation of the repetition" to the switching unit 306.

In contrast, when the evaluation of the latest recognition result is equal to or lower than that of the recognition result obtained just before the repetition, the result comparison unit 502 outputs the determination of "end of the repetition" to the switching unit 306.

In the latter case, the second determination unit 305 outputs the determination of "output of the input image" to the switching unit 306. This means that the reliability rates of the character regions which are obtained based on the latest recognition result are lower than the reliability rates of the character regions obtained based on the recognition result obtained just before the repetition, so that the corrected image which is obtained just before the repetition and which is held by the storage unit 301 is to be output instead of the latest corrected image.

Now, a method of determining whether or not a recognition result is improved, which is performed by the result comparison unit 502, will be described. The recognition result includes reliability rates of extracted character regions. The result comparison unit 502 uses these reliability rates to compare the recognition results. A reliability rate is represented by a continuous value ranging from 0 to 1 as described above.

For example, a threshold for the reliability rate is set to 0.5. The result comparison unit 502 counts the number of character regions that have a reliability rate exceeding the threshold, with respect to the character regions obtained before the repetition and those obtained after the repetition. It is assumed that the larger the number of character regions that have a reliability rate exceeding the threshold is, the higher the evaluation of the corresponding recognition result is. Under this assumption, the result comparison unit 502 determines whether or not a recognition result is improved. An increase in the number of character regions that have a reliability rate exceeding the threshold means that the blur correction is effective.

Thus, by repeating the process of computing a degree of blurring and the process of correcting blurring, the effect of the blur correction is enhanced. The number of character regions used for the computation of the degree of blurring is increased, whereby a more adequate degree of blurring is obtained.

Operations

Figure 16:
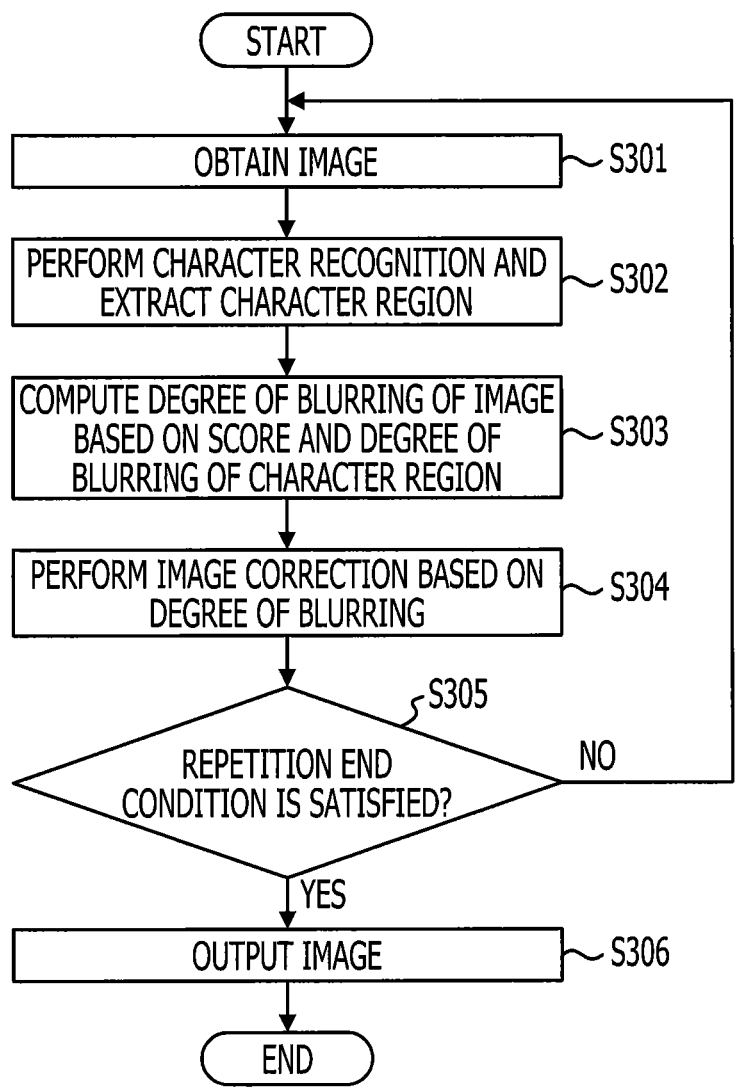
FIG. 16 is a flowchart of exemplary image processing according to the second embodiment.

Now, operations of the image processing apparatus 20 according to the second embodiment will be described. FIG. 16 is a flowchart of exemplary image processing according to the second embodiment. Steps S301 to S304 illustrated in FIG. 16 are similar to steps S101 to S104 illustrated in FIG. 11, and will not be described.

In step S305, the second determination unit 305 determines whether the condition for determining the end of the repetition has been satisfied. The condition for determining the end of the repetition may be, for example, a condition which employs use of the number of repetitions or use of recognition results obtained before and after a repetition, as described above.

If the repetition is determined to be ended (YES in step S305), the process proceeds to step S306. If the repetition is determined not to be ended (NO in step S305), the process returns back to step S301. If the repetition is to be continued, the obtaining unit 302 obtains the corrected image from the storage unit 301.

In step S306, the switching unit 306 outputs the corrected image obtained before or after the repetition. The output destination is, for example, a memory in the image processing apparatus 20 or the display unit 12.

Figure 17:
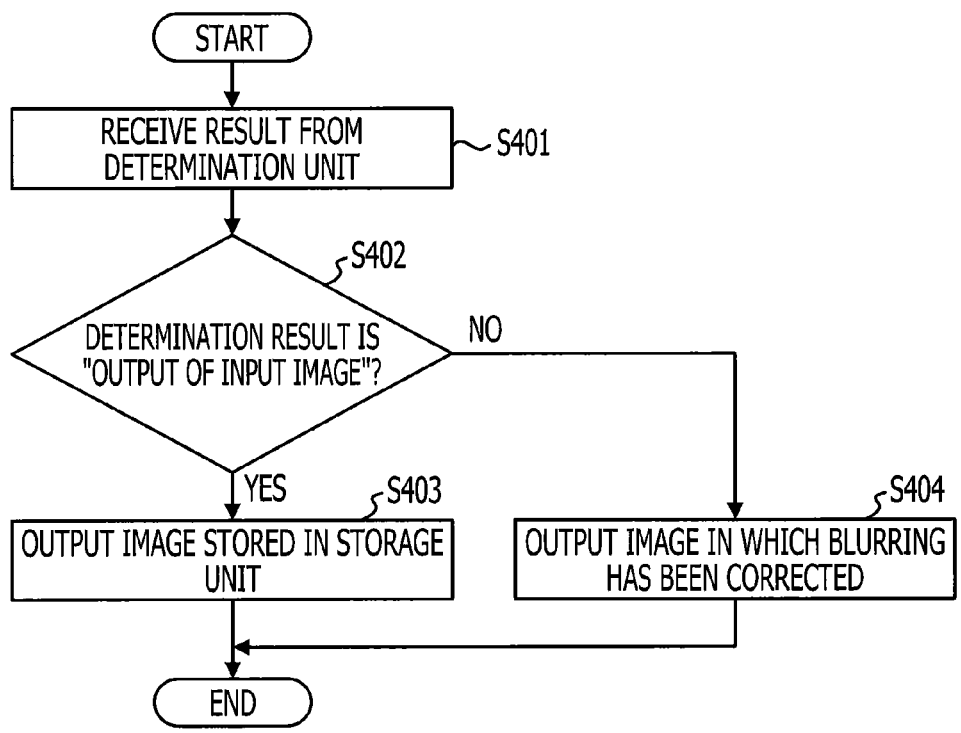
FIG. 17 is a flowchart of an exemplary process performed by a switching unit.

FIG. 17 is a flowchart of an exemplary process performed by the switching unit 306. In step S401 illustrated in FIG. 17, the switching unit 306 receives the determination result from the second determination unit 305.

In step S402, the switching unit 306 determines whether or not the determination result is the result of "output of the input image". For example, when the second determination unit 305 illustrated in FIG. 15 is used, the determination result includes the result of "output of the input image". When the second determination unit 305 illustrated in FIG. 14 is used, the determination result includes the result of "output of the corrected image".

If the condition in step S402 is satisfied (YES in step S402), the process proceeds to step S403. If the condition in step S402 is not satisfied (NO in step S402), the process proceeds to step S404.

In step S403, the switching unit 306 outputs the corrected image which is obtained before the repetition and which is stored in the storage unit 301.

In step S404, the switching unit 306 outputs the corrected image which has been corrected by the correction unit 303 and which is obtained after the repetition.

As described above, according to the second embodiment, by repeating the process of computing a degree of blurring and the process of correcting blurring, the effect of the blur correction is enhanced. The number of character regions used for the computation of the degree of blurring is increased, whereby a more adequate degree of blurring is obtained.

In addition, according to the second embodiment, it is possible to resolve the problem in that accuracy of character recognition is often reduced because an input image to be subjected to blur correction has low image quality. This is because blurring is repeatedly corrected, resulting in improvement in the image quality and in accuracy of character recognition.

Third Embodiment

Now, an image processing apparatus according to a third embodiment will be described. According to the third embodiment, a document image is divided into subregions, and the degrees of blurring obtained for the subregions are used to compute the degrees of blurring of pixels.

Techniques for computing the degree of blurring of each of the subregions are described in, for example, Japanese Laid-open Patent Publication No. 2002-112099 and No. 2005-332381. As described in the above-mentioned documents, an image is divided into subregions, and determination is made as to whether or not the image is readable in accordance with the degrees of blurring of the subregions. In addition, the degree of blurring of each of pixels in a subregion may be obtained, and blurring of each pixel may be corrected.

In the related art, a degree of blurring is not obtained from a subregion in which no characters are present, and it is not possible to compute the degree of blurring of each of pixels in such a subregion. Accordingly, there remain pixels for which blurring is not corrected in accordance with their degrees of blurring. In addition, even when characters are present in all of the subregions, if character detection results in failure, the characters are regarded as not being present. Thus, in the method of obtaining the degree of blurring of each of the pixels by dividing a document image into subregions, there arises a problem in that there are subregions for which the degrees of blurring are not obtained.

According to the third embodiment, for subregions in which no characters are present or subregions for which character detection results in failure, the degrees of blurring are computed from other subregions for which the degrees of blurring have been obtained, and the computed degrees of blurring are set to those subregions. Thus, blurring may be corrected also for the subregions in which no characters are present or for which character detection results in failure, like other subregions. The hardware of the image processing apparatus according to the third embodiment is similar to that according to the first embodiment, and will not be described.

Configuration

Figure 18:
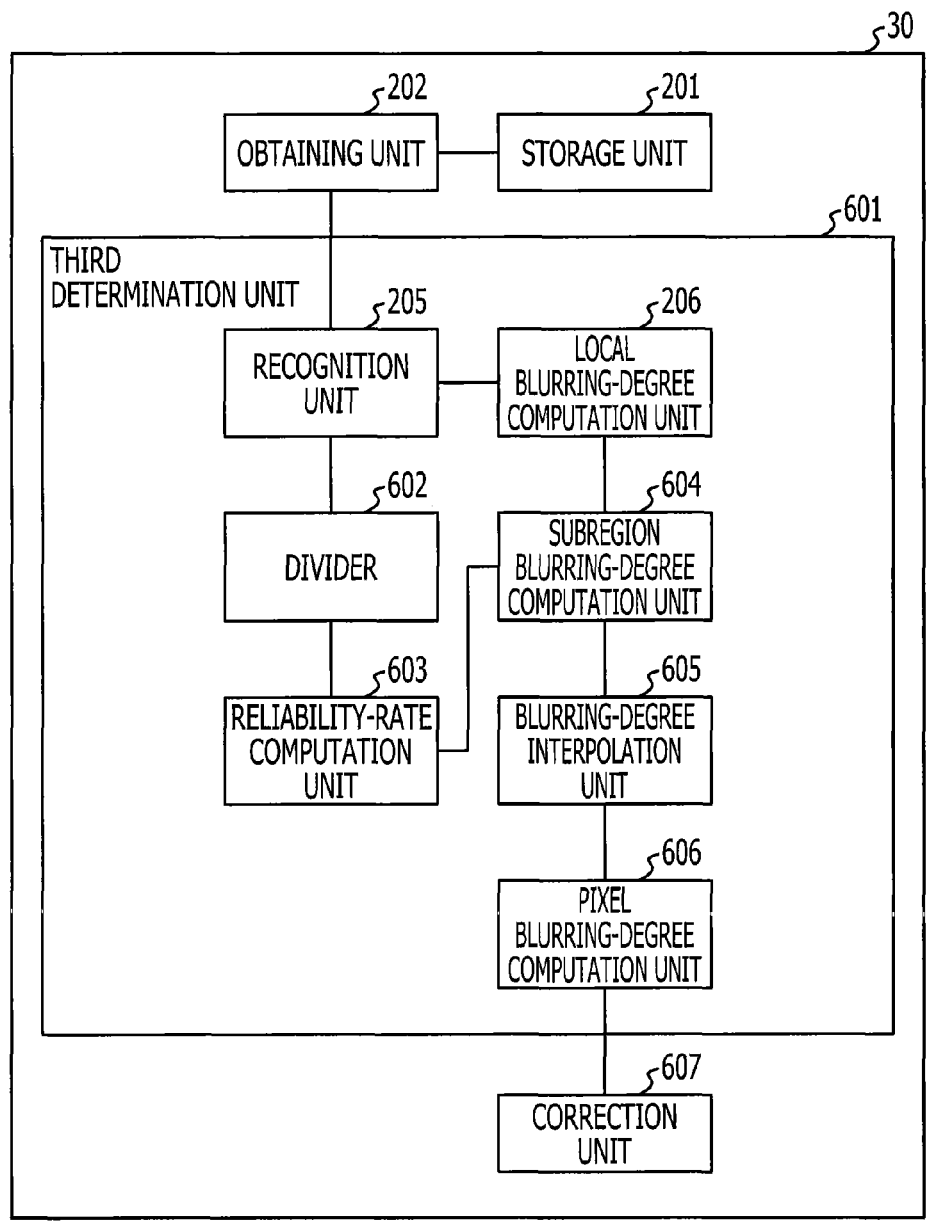
FIG. 18 is a block diagram illustrating exemplary functions of an image processing apparatus according to a third embodiment.

FIG. 18 is a block diagram illustrating exemplary functions of an image processing apparatus 30 according to the third embodiment. In the configuration illustrated in FIG. 18, components that are similar to those illustrated in FIG. 2 are designated with the same reference numerals, and will not be described. According to the third embodiment, a third determination unit 601 and a correction unit 607 are different from those according to other embodiments.

A divider 602 divides an input image into subregions. Any dividing method may be employed. For example, the size of a subregion is represented by w×h, e.g., 256×256, where w represents the horizontal size and h represents the vertical size, and the size of the entire image is represented by W×H. When the divider 602 divides an image into equal subregions in such a manner that the number of the subregions is W/w+1 in the horizontal direction and the number of the subregions is H/h+1 in the vertical direction, the size of one subregion is approximately w×h. The divider 602 outputs information about the divided subregions to a reliability-rate computation unit 603. The division into subregions which is performed by the divider 602 may be performed before the character recognition.

The reliability-rate computation unit 603 performs the same operation as the reliability-rate computation unit 207 as described above on each of the subregions. Desirably, the reliability-rate computation unit 603 selects only character regions which belong to a target subregion. Accordingly, the reliability-rate computation unit 603 may select character regions whose character position coordinates (cx, cy) as described above are included in the target subregion. The reliability-rate computation unit 603 outputs the computed reliability rates of characters in the subregion to a subregion blurring-degree computation unit 604.

The subregion blurring-degree computation unit 604 performs the same process as the blurring-degree computation unit 208 as described above on the subregions. The subregion blurring-degree computation unit 604 computes the degree of blurring of each of the subregions, and outputs the computed degrees of blurring to a blurring-degree interpolation unit 605.

The blurring-degree interpolation unit 605 sets an interpolation value as a degree of blurring to a subregion to which a degree of blurring has not been set. The blurring-degree interpolation unit 605 scans the subregions in certain scanning order, for example, from the upper left subregion. When the blurring-degree interpolation unit 605 detects a subregion to which a degree of blurring has not been set, the blurring-degree interpolation unit 605 sets, to the subregion, the average of the degrees of blurring of subregions adjacent to the detected subregion. The blurring-degree interpolation unit 605 outputs the resulting degrees of blurring of subregions which are obtained through the interpolation to a pixel blurring-degree computation unit 606.

Figure 19:
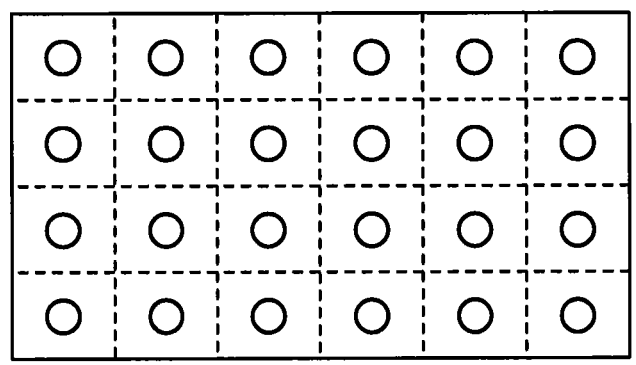
FIG. 19 is a diagram illustrating exemplary subregions of a document image.
Figure 20:
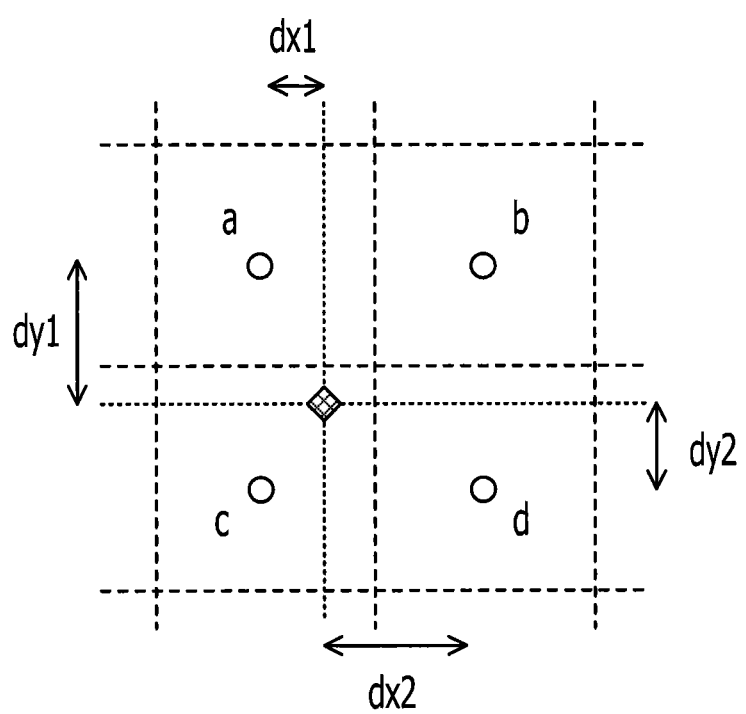
FIG. 20 is a diagram for explaining a process of computing the degree of blurring of each of pixels.

The pixel blurring-degree computation unit 606 computes the degree of blurring of each of pixels through linear interpolation from the degrees of blurring of subregions adjacent to the pixel. Referring to FIGS. 19 and 20, a method of computing the degree of blurring of each of pixels will be described.

FIG. 19 is a diagram illustrating exemplary subregions of a document image. A center point of each of the subregions illustrated in FIG. 19, which is represented by a small circle, is regarded as a representative point of the subregion. When the degree of blurring of each of the subregions is computed, the degree of blurring of the subregion is regarded as the degree of blurring of the corresponding representative point.

Now, FIG. 20 is a diagram for explaining a process of computing the degree of blurring of each of pixels. In the example illustrated in FIG. 20, four representative points of subregions are illustrated. The degrees of blurring of the representative points are represented by a to d.

A pixel whose degree of blurring is to be obtained is represented by a rhombus. Distances from the representative points to the pixel are denoted by dx1, dy1, dx2, and dy2. The pixel blurring-degree computation unit 606 computes the degree of blurring BP for the position of the rhombus by using Expression (9).

$$BP = \frac{(dx2 \times dy2) \times a + (dx1 \times dy2) \times b + (dx2 \times dy1) \times c + (dx1 \times dy1) \times d}{(dx1 + dx2) \times (dy1 + dy2)} \quad \text{Expression (9)}$$

The pixel blurring-degree computation unit 606 outputs the computed degrees of blurring BP for pixels to the correction unit 607.

The correction unit 607 corrects blurring for the pixels based on the degrees of blurring of the pixels which are obtained from the pixel blurring-degree computation unit 606. To correct blurring, a known technique may be used. For example, by substituting the BP of each of the pixels for the Bdoc in Expression (8), blurring of each of the pixels is allowed to be corrected.

Thus, for subregions in which no characters are present or subregions for which character detection results in failure, blurring may be corrected based on an adequate degree of blurring like other subregions.

Operations

Figure 21:
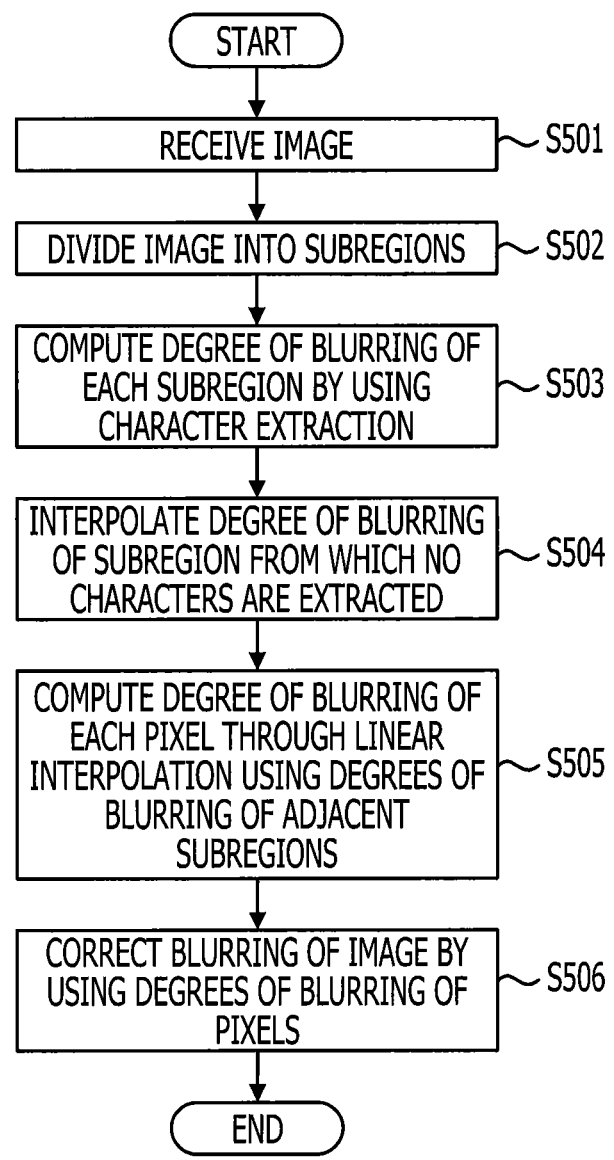
FIG. 21 is a flowchart of exemplary image processing according to the third embodiment.

Now, operations of the image processing apparatus 30 according to the third embodiment will be described. FIG. 21 is a flowchart of exemplary image processing according to the third embodiment. Step S501 illustrated in FIG. 21 is similar to step S101 illustrated in FIG. 11, and will not be described.

In step S502, the divider 602 divides a document image into subregions having a certain size.

In step S503, the subregion blurring-degree computation unit 604 computes the degree of blurring for the entirety of each of the subregions by using the degrees of local blurring of character regions.

In step S504, the blurring-degree interpolation unit 605 interpolates the degree of blurring of a subregion from which no characters are extracted, from the degrees of blurring of subregions adjacent to the subregion.

In step S505, the pixel blurring-degree computation unit 606 computes the degree of blurring of each of pixels through linear interpolation using the degrees of blurring of subregions adjacent to the pixel.

In step S506, the correction unit 607 corrects blurring of the document image by using the degrees of blurring of the pixels.

Figure 22:
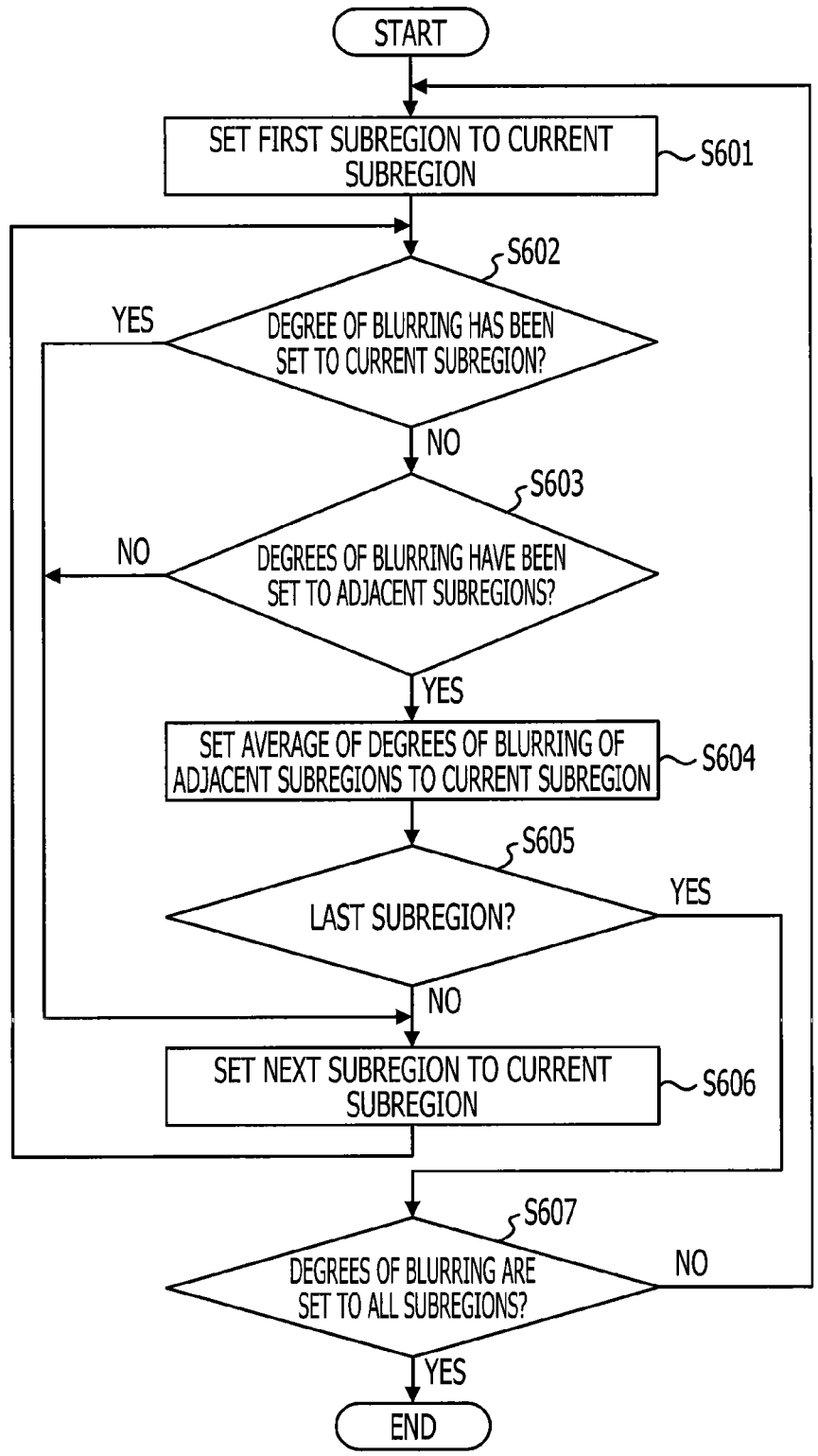
FIG. 22 is a flowchart of an exemplary process of interpolating degrees of blurring.

FIG. 22 is a flowchart of an exemplary process of interpolating degrees of blurring. In step S601 illustrated in FIG. 22, the blurring-degree interpolation unit 605 sets a first subregion to be processed, to the current subregion. The current subregion refers to a subregion which is currently being processed. For example, the upper left subregion may be set in advance to a first subregion to be processed.

In step S602, the blurring-degree interpolation unit 605 determines whether or not a degree of blurring has been set to the current subregion. If a degree of blurring has been set to the current subregion (YES in step S602), the process proceeds to step S606. If a degree of blurring has not been set to the current subregion (NO in step S602), the process proceeds to step S603.

In step S603, the blurring-degree interpolation unit 605 determines whether or not degrees of blurring have been set to adjacent subregions. The adjacent subregions refer to subregions adjacent to the current subregion. If degrees of blurring have been set (YES in step S603), the process proceeds to step S604. If degrees of blurring have not been set (NO in step S603), the process proceeds to step S606.

In step S604, the blurring-degree interpolation unit 605 sets the average of the degrees of blurring of the adjacent subregions to the current subregion.

In step S605, the blurring-degree interpolation unit 605 determines whether or not the current subregion is the last subregion. The last subregion refers to a subregion located as the last subregion when the subregions are scanned in certain order.

If the current subregion is the last subregion (YES in step S605), the process proceeds to step S607. If the current subregion is not the last subregion (NO in step S605), the process proceeds to step S606.

In step S606, the blurring-degree interpolation unit 605 sets the next subregion to the current subregion. The next subregion refers to the subregion next to the current subregion in the certain scanning order.

In step S607, the blurring-degree interpolation unit 605 determines whether or not degrees of blurring are set to all of the subregions. If degrees of blurring are set to all of the subregions (YES in step S607), the process is ended. If degrees of blurring are not set to all of the subregions (NO in step S607), the process returns back to step S601.

As described above, according to the third embodiment, for subregions in which no characters are present or subregions for which character detection results in failure, blurring may be corrected based on an adequate degree of blurring like other subregions. In addition, even when the degrees of blurring in different positions in an image are different from each other, blurring may be adequately corrected.

Modifications

By recording a program for achieving the image processing described in the above-described embodiments on a recording medium, a computer may be caused to execute the image processing according to the embodiments. For example, this program is recorded on a recording medium and a computer is caused to access the recording medium storing the program, thereby achieving the above-described image processing.

Various types of recording media may be used, e.g., recording media which optically, electrically, or magnetically record information, such as a compact disk-read-only memory (CD-ROM), a flexible disk, and a magneto-optical disk, and semiconductor memories which electrically record information, such as a read-only memory (ROM) and a flash memory. However, the recording media do not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a recognition unit that performs character recognition on an image including at least one character and that obtains a score indicating a recognition accuracy of at least one character region extracted through the character recognition;
a local blurring-degree computation unit that computes a first degree of blurring of the at least one character region; and
a blurring-degree computation unit that computes a second degree of blurring of the image by using the score and the first degree of blurring of the at least one character region.

2. An image processing apparatus comprising:
a memory; and
a processor coupled to the memory and configured to:
perform first character recognition on an image,
obtain a first score indicating a recognition accuracy of at least one character region extracted through the first character recognition,
compute a first degree of blurring of the at least one character region, and
compute a second degree of blurring of the image by using the first score and the first degree of blurring of the at least one character region.

3. The image processing apparatus according to claim 2, wherein the processor is further configured to:
compute a first reliability rate indicating reliability of the first degree of blurring of the at least one character region based on the first score of the at least one character region, and
wherein the second degree of blurring is computed based on weighted averaging of the first degree of blurring using the first reliability rate.

4. The image processing apparatus according to claim 3, wherein the first reliability rate is a probability value indicating a possibility with which a character in the at least one character region is correctly recognized.

5. The image processing apparatus according to claim 3, wherein the at least one character region is selected from the at least one extracted character region based on the first score or the first reliability rate, and the first degree of blurring is computed for the at least one selected character region.

6. The image processing apparatus according to claim 2, wherein the processor is further configured to:
perform first correction on the image by using the second degree of blurring, and
output the corrected image.

7. The image processing apparatus according to claim 6, wherein, when the corrected image satisfies a certain condition, the corrected image is output.

8. The image processing apparatus according to claim 7, wherein, when the certain condition is not satisfied, the processor is further configured to:
perform second character recognition on the corrected image,
compute a third degree of blurring of the image based on the second character recognition,
perform second correction based on the third degree of blurring,
determine whether or not a result of the second correction satisfies the certain condition, and
when the result of the second correction satisfies the certain condition, output the image that has been subjected to the second correction.

9. The image processing apparatus according to claim 8, wherein the processor is further configured to:
compute a first reliability rate indicating reliability of the first degree of blurring of the at least one character region based on the first score of the at least one character region, and
wherein the second degree of blurring is computed based on weighted averaging of the first degree of blurring using the first reliability rate.

10. The image processing apparatus according to claim 9, wherein when the number of character regions having a second score or a second reliability rate that is used to compute the third degree of blurring and that is equal to or more than a threshold is equal to or less than the number of character regions having the first score or the first reliability rate that is used to compute the second degree of blurring and that is equal to or more than the threshold, the image that has been subjected to the second correction is output.

11. An image processing method executed by a computer, the image processing method comprising:
performing first character recognition on an image including at least one character;
obtaining a score indicating a recognition accuracy of at least one character region extracted through the first character recognition;
computing a first degree of blurring of the at least one character region; and
computing a second degree of blurring of the image by using the score and the first degree of blurring of the at least one character region.

12. The image processing method according to claim 11, the image processing method further comprising:
computing a reliability rate indicating reliability of the first degree of blurring of the at least one character region based on the score of the at least one character region; and
in the computing of the second degree of blurring, computing the second degree of blurring based on weighted averaging of the first degree of blurring using the reliability rate.

13. The image processing method according to claim 11, the image processing method further comprising:
performing first correction on the image by using the second degree of blurring; and
outputting the corrected image.

14. The image processing method according to claim 13, wherein in the outputting of the corrected image, when the corrected image satisfies a certain condition, the corrected image is output.

15. The image processing method according to claim 14, the image processing method further comprising:
when the certain condition is not satisfied,
performing second character recognition on the corrected image;
computing a third degree of blurring of the image based on the second character recognition;
performing second correction based on the third degree of blurring;
determining whether or not a result of the second correction satisfies the certain condition; and
when the result of the second correction satisfies the certain condition, outputting the image that has been subjected to the second correction.

16. A storage medium storing an image processing program that causes a computer to execute operations, the operations comprising:
performing first character recognition on an image including at least one character;
obtaining a score indicating a recognition accuracy of at least one character region extracted through the first character recognition;
computing a first degree of blurring of the at least one character region; and
computing a second degree of blurring of the image by using the score and the first degree of blurring of the at least one character region.

17. The storage medium according to claim 16, the operations further comprising;
computing a reliability rate indicating reliability of the first degree of blurring of the at least one character region based on the score of the at least one character region; and
in the computing of the second degree of blurring, computing the second degree of blurring based on weighted averaging of the first degree of blurring using the reliability rate.

18. The storage medium according to claim 16, the operations further comprising:
performing first correction on the image by using the second degree of blurring; and
outputting the corrected image.

19. The storage medium according to claim 18, wherein in the outputting of the corrected image, when the corrected image satisfies a certain condition, the corrected image is output.

20. The storage medium according to claim 19, the operations further comprising:
when the certain condition is not satisfied,
performing second character recognition on the corrected image;
computing a third degree of blurring of the image based on the second character recognition;
performing second correction based on the third degree of blurring;
determining whether or not a result of the second correction satisfies the certain condition; and when the result of the second correction satisfies the certain condition, outputting the image that has been subjected to the second correction.

* * * * *